March 2, 1926.

S. M. HUNN 1,574,975

BRAKE FOR MOTOR OPERATED HOISTS

Filed August 5, 1924 2 Sheets-Sheet 1

INVENTOR
Sidney M. Hunn.
BY
ATTORNEYS

March 2, 1926.
S. M. HUNN
1,574,975
BRAKE FOR MOTOR OPERATED HOISTS
Filed August 5, 1924 2 Sheets-Sheet 2
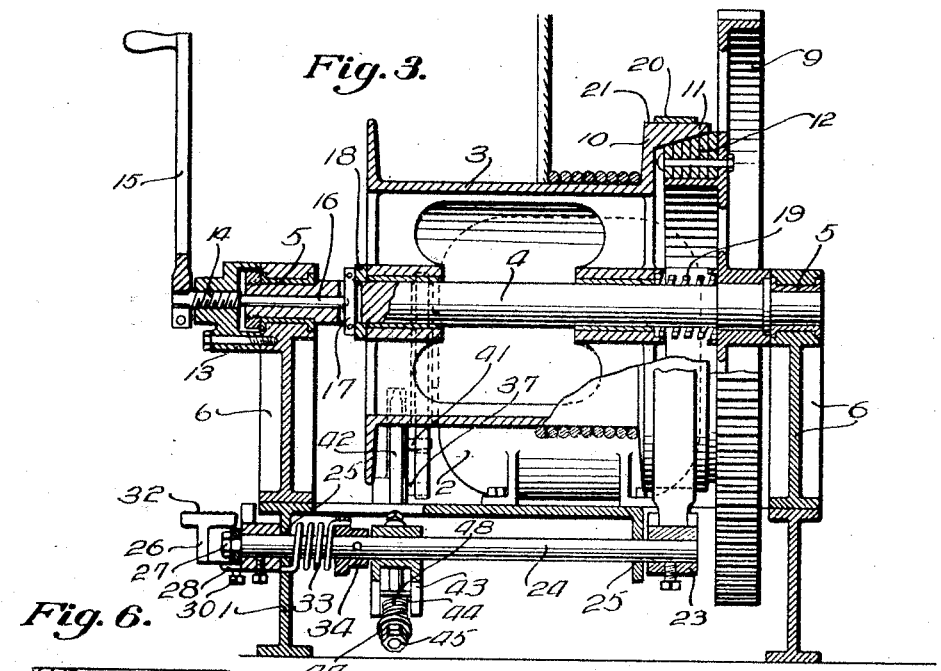
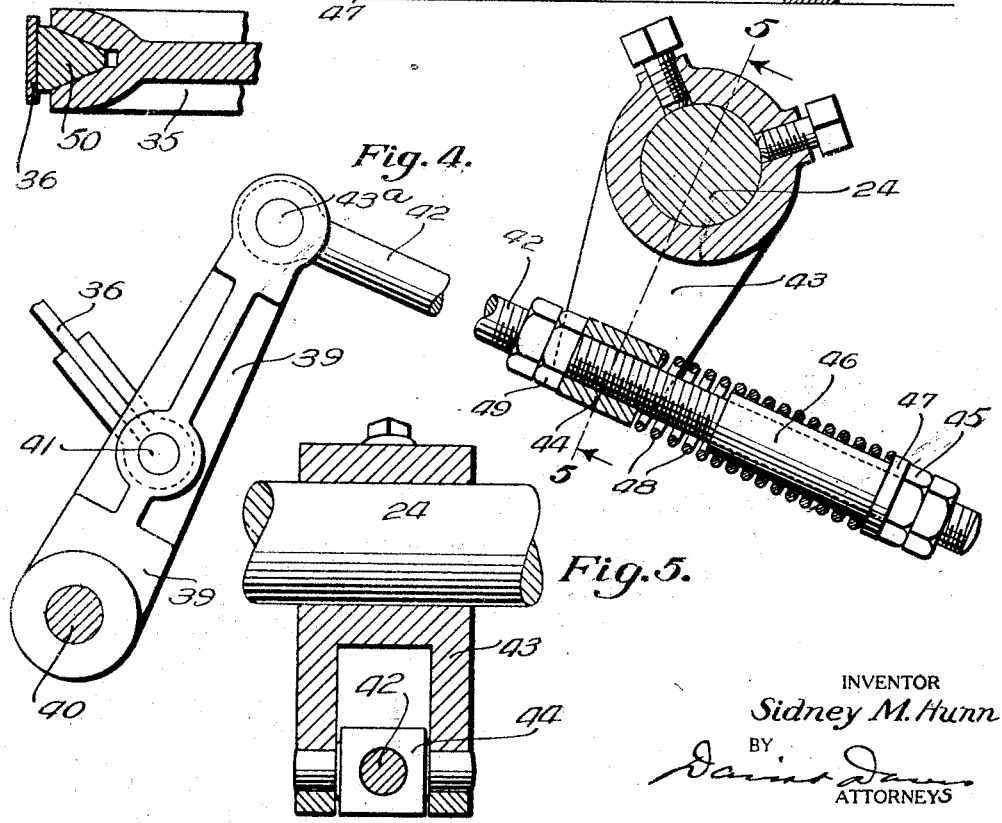
INVENTOR
Sidney M. Hunn
BY
ATTORNEYS Patented Mar. 2, 1926.

1,574,975

UNITED STATES PATENT OFFICE.

SIDNEY M. HUNN, OF WOODHAVEN, NEW YORK, ASSIGNOR TO THOMAS & BUCKLEY HOISTING CO., OF NEW YORK, N. Y., A CORPORATION OF NEW YORK.

BRAKE FOR MOTOR-OPERATED HOISTS.

Application filed August 5, 1924. Serial No. 730,230.

*To all whom it may concern:*

Be it known that I, SIDNEY M. HUNN, a citizen of the United States, and resident of Woodhaven, Long Island, in the county of Queens and State of New York, have invented certain new and useful Improvements in Brakes for Motor-Operated Hoists, of which the following is a specification.

This invention relates to improvements in braking means for controlling the rotation of the cable drum of a motor operated hoist.

An object of the invention is to provide a brake mechanism including two brakes, one of said brakes being adapted to be operated to control the cable drum under normal conditions and the other brake adapted to be easily and quickly rendered effective to control the drum in the event of a failure of the first brake.

Another object of the invention is to provide a brake mechanism including a service brake and an emergency brake both brakes being operated by the same lever. Under ordinary conditions the lever is shifted in one direction to apply the service brake to control the rotation of the cable drum, the said brake preventing the lever from moving far enough to fully apply the emergency brake. In the event of a failure of the service brake under the strain of the brake applying force applied to the lever, the lever is free to be moved further by merely a continued application of the force to fully apply the emergency brake and control the drum.

Figure 1:
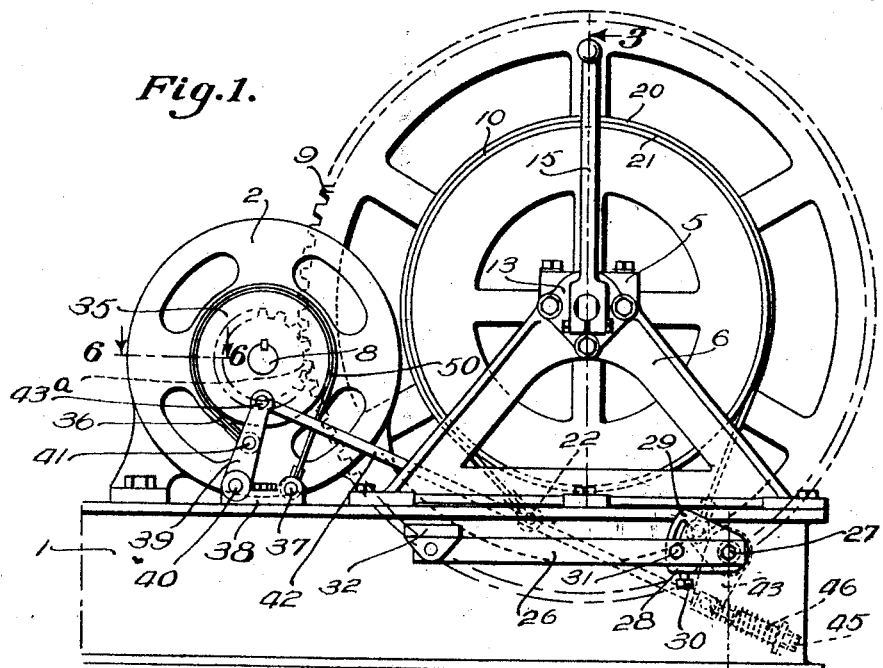
Figure 2:
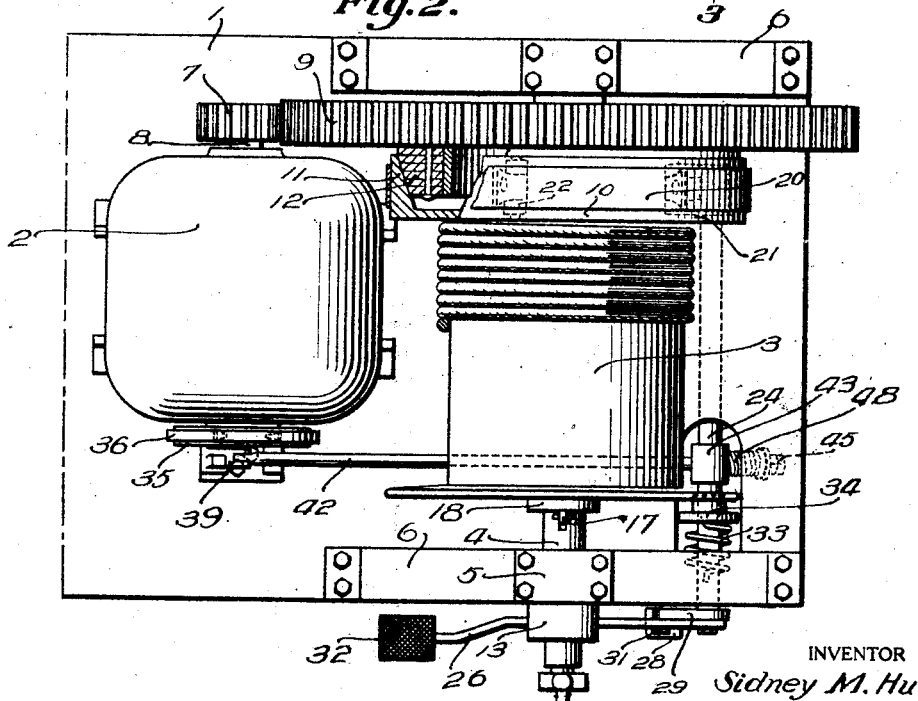

In the drawings, Fig. 1 is a side elevation of an electric motor operated hoisting apparatus provided with the improved brake mechanism;

Fig. 2 a plan view thereof;

Fig. 3 a vertical section on the line 3—3 of Fig. 1;

Fig. 4 a view of part of the brake mechanism on an enlarged scale;

Fig. 5 a section on the line 5—5 of Fig. 4; and

Fig. 6 a detail section on the line 6—6 of Fig. 1.

Referring to the drawings by numerals, 1 designates the bed or base of the hoist. An electric motor 2 is mounted upon the base and a drum 3 upon which the hoisting cable is wound is mounted upon a supporting shaft 4. The shaft 4 is supported at its ends in bearings 5 at the upper ends of supporting pedestals 6 bolted at opposite edges of the base 1. A pinion 7 is fixed to one end of the armature or drive shaft 8 of the motor and meshes with a relatively large follower gear 9 keyed to the shaft 4 at the inner side of one of its bearings 5. The cable drum 3 is mounted upon the shaft between the bearings and is free to rotate on the shaft and to move endwise slightly thereon. The end of the drum 3 adjacent the gear 9 is formed as at 10 to provide a combined brake drum and female member 11 of a friction clutch. The male member 12 of the clutch is rigidly carried by the gear 9 and has a conical friction surface that is adapted to be forced within a surface of corresponding shape in the female clutch member on the drum.

A small casing 13 is bolted to the outer side of the pedestal 6 at the opposite end of the shaft 4 from the clutch and threaded into said casing 13 in longitudinal alinement with the shaft is a screw 14. The screw 14 projects outwardly, has a relatively long operating handle 15 fixed thereon and its inner end abuts the end of a longitudinal pin 16 that is adapted to slide longitudinally in a bore extending inwardly from the end of the shaft 4. The inner end of the pin 16 is adapted to contact a pin 17 which extends transversely of the shaft 4 and has its ends extending outwardly of the shaft and in contact with a collar 18 on the shaft which is in turn adapted to contact the hub of the cable drive. The transverse pin 17 extends through a transverse slot in the shaft 4 and said slot is large enough to permit of a slight movement of the pin longitudinally of the shaft. A strong coiled spring 19 is interposed between the opposed hubs of the drum 3 and the follower gear 9 and tends to force the drum longitudinally of the shaft toward the transverse pin 17 and separate the clutch members.

To apply the clutch, the operating handle 15 upon the screw 14 is pulled to the left (with reference to Fig. 1) to move the screw and the pins 16 and 17 inwardly and force the drum 3 through the engagement of the collar 18 into tight contact with the clutch member 12 upon the gear 9 and effect a driving connection between the drum and the motor. By operating the clutch through the medium of the screw 14 and the long handle 15 it is possible to secure a very strong application by a comparatively slight exertion of force.

A brake band 20 extends around the brake drum surface 21 of the cable drum 3, has its ends extended downwardly and one end connected to a pin 22 fixed to the base and the other end connected to an arm 23 rigidly connected to a rock shaft 24. The shaft 24 has its ends journaled in opposite sides of the frame 25 of the base and has a brake operating foot lever 26 connected thereto outwardly of the frame. The lever 26 is connected to the end of the shaft 24 by a bolt 27 and is adapted to rock the shaft through its engagement with an abutment 28 upon a segmental plate 29 fixed to the rock shaft. The lever 26 is adjustable with relation to the plate by means of bolts 30 and 31 extending through the plate 29. This adjustment is provided in order to position the tread portion 32 of the foot lever at the proper elevation. The foot lever is normally held up in release position by a coiled spring 33 which encircles the shaft and has one end connected to the base 1 and the other end connected to an arm extending from a collar 34 fixed to the rock shaft.

A brake drum or pulley 35 is fixed to the motor shaft 8 at the opposite end thereof from the pinion 7 and a brake band 36 encircles said drum. One end of the band 36 extends downwardly and is connected to a fixed pin 37 upon a block 38 bolted to the base 1. A lever 39 has its lower end pivoted to the block 38 as at 40. This lever extends upwardly and intermediate its ends has the free, downwardly extending end of the brake band connected thereto as at 41. The upper end of the lever 39 is operatively connected to the rock shaft 24. This operative connection includes a pull rod 42 pivotally connected as at 43ᵃ to the upper end of the lever 39. An arm 43 is fixed to the rock shaft 24, extends downwardly therefrom and is formed with a fork at its lower end within which is pivoted a block 44. The pull rod 42 extends from the lever 39 through a bore in the block 44 and beyond said block and has a nut 45 and a check nut threaded upon its outer free end. The nut 45 serves as an abutment for one end of the spacing and stop sleeve 46 on the rod. This sleeve is formed with an abutment 47 at its outer end and between this abutment and the block 44 is interposed a coiled spring 48, which encircles the rod and the sleeve and tends to normally hold the block 44 in contact with a nut 49 threaded upon the rod at the opposite side of the block and held in place by a check nut. In this position of the parts the inner end of the stop sleeve is spaced from the opposed end of the block 44.

The brake drum or pulley 35 upon the motor shaft is formed with a V-shape groove, and a friction brake lining 50 of corresponding shape in cross section is interposed between the brake band and the pulley and adapted to be pressed into the groove. This greatly increases the friction and renders it possible to secure a strong application of the brake with a minimum of effort and without the necessity of using a large drum or pulley.

In the operation of the brake mechanism the operator depresses the foot lever 26 against the resistance of spring 33 and rocks the shaft 24 and the arm 23 to contract the brake band 20 about its drum. The rotation of the cable drum is controlled by this brake under ordinary circumstances and said brake may therefore be termed the service brake. The service brake limits the downward movement of the foot lever and the rotation of the rock shaft and with a proper adjustment of the various parts said movement of the lever for a full service brake application will be insufficient to effect a material application of the brake upon the motor shaft which brake may be termed the emergency brake. The movement of the lever for an application of the service brake causes the rock shaft to be rotated and the arm 43 to be swung, but owing to the space between the block 44 and the stop sleeve 46 the block will be slid along the pull rod and thereby compress the spring 48. There is thus a yielding pull exerted upon the pull rod which rocks the lever 39, contracts the brake band 36 and causes a light application of the emergency brake in preparation for a possible failure of the service brake. In case of a failure of the service brake owing to a broken brake band or the like cause, the foot lever will be freed for further downward movement and by simply a maintenance of pressure upon the lever by the operator the lever will be forced quickly down, thereby rocking the rock shaft and the arm 43 further to cause the block 44 to engage the end of the stop sleeve and effect a positive connection with the pull rod and bring about a full application of the emergency brake. The initial compression of the spring on the pull rod during the application of the service brake stores up energy in the spring which tends to quicken the emergency application when the service brake fails. The emergency application is effected immediately after the failure of the service brake and the weight that is being sustained by the hoisting cable is allowed no time in which to gain momentum in its descent when the service brake fails. When the rotation of the drive shaft is arrested by the emergency brake the cable drum will also be under control owing to its connection with the drive shaft through the gears and the friction clutch.

A proper adjustment of the pull rod, the block 44, and the stop sleeve 46 to secure the desired braking result is effected by adjusting the nuts threaded on the pull rod.

What I claim is:

1. In a hoisting apparatus, a motor having a drive shaft, a hoisting cable drum, a driving connection between said drive shaft and the drum, a service brake adapted to be operated to prevent rotation of the drum, an emergency brake adapted to be operated to prevent rotation of the motor drive shaft, and brake operating means adapted to be shifted in one direction to apply the service brake the extent of said shift being limited by the service brake and said operating means being adapted upon a failure of said brake to be shifted further in the same direction and apply the emergency brake and hold the drive shaft against rotation, the said driving connection between the drive shaft and the drum being adapted to hold the drum against rotation when said shaft is held.

2. In a hoisting apparatus, a motor having a drive shaft, a hoisting cable drum, a friction driving connection between said drive shaft and the drum, a service brake adapted to be operated to control or stop the rotation of the drum, an emergency brake adapted to be operated to control or stop the rotation of the drive shaft, and brake operating means adapted to be shifted in one direction to apply the service brake the extent of said shift being limited by the service brake and said operating means being adapted to be shifted further in the same direction to apply the emergency brake upon failure of the service brake, the said driving connection between the shaft and the drum being adapted to hold the drum against rotation when the shaft is held by the emergency brake.

3. In a hoisting apparatus, a hoisting cable drum, a service brake, an emergency brake, both brakes being adapted to hold the drum against rotation, and brake operating means adapted to be moved in one direction to fully apply the service brake and lightly apply the emergency brake, the extent of said movement of the operating means being limited by the service brake and said operating means being adapted to be moved further in the same direction upon failure of the service brake and to cause a full application of the emergency brake by said further movement.

4. In a hoisting apparatus, a motor having a drive shaft, a hoisting cable drum, a driving connection between said drive shaft and drum, a service brake adapted to be operated to hold the drum against rotation, an emergency brake adapted to be operated to hold the shaft against rotation, brake operating means adapted to be shifted in one direction to apply the service brake the extent of said shift being limited by the service brake, and an operative connection between said brake operating means and the emergency brake, said connection being adapted to initially yield relatively to the operating means when said means is shifted, whereby the service brake may be fully applied and the emergency brake lightly applied and said connection being adapted upon failure of the service brake to be moved positively with the operating means to fully apply the emergency brake to hold the drum against rotation through the means of the drive shaft and the said driving connection.

5. In a hoisting apparatus a hoisting cable drum, a service brake, an emergency brake, both brakes adapted to be operated to hold the drum against rotation, and brake operating means including a lever adapted to be moved in one direction to fully apply the service brake, the extent of said movement being limited by the service brake and the said lever being adapted to be freed for further movement in the same direction upon failure of the service brake and to cause a full application of the emergency brake by said further movement.

6. In a hoisting apparatus, a hoisting cable drum, a service brake, an emergency brake, both brakes adapted to hold the drum against rotation, brake operating means adapted to be shifted in one direction to apply the service brake the extent of said shift being limited by the brake, and an operative connection between said brake operating means and the emergency brake, said connection being adapted to initially yield relatively to the operating means when said means is shifted whereby the service brake may be fully applied and the emergency brake lightly applied and said connection being adapted to be moved positively with the operating means to fully apply the emergency brake when said operating means is free to be shifted further in the same direction as the result of a failure of the service brake.

7. In a hoisting apparatus, a hoisting cable drum, a service brake, an emergency brake, both brakes being adapted to hold the drum against rotation, brake operating means adapted to be shifted in one direction to apply the service brake, the extent of said shift being limited by the brake, and an operative connection between said brake operating means and the emergency brake, said connection including a spring adapted to yield and permit a full application of the service brake and a light application of the emergency brake and said connection being adapted to positively connect with the operating means and move therewith to fully apply the emergency brake when said means is free to move further in the same direction as the result of a failure of the service brake.

8. In a hoisting apparatus, a hoisting cable drum, a service brake, an emergency brake, both brakes adapted to be operated to hold the drum against rotation, and brake operating means including a foot lever adapted to be depressed to fully apply the service brake the extent of said depression being limited by the service brake, the said lever being adapted to be freed for further depression by failure of the service brake and to fully apply the emergency brake by said further movement.

9. In a hoisting apparatus, a motor having a drive shaft, a hoisting cable drum, a drive gear fixed to the drive shaft, a follower gear meshed with the drive gear, a friction clutch between the follower gear and the cable drum, means for operating said clutch to connect the driver to the drum, a brake connected to the drum and adapted to prevent its rotation, a brake connected to the drive shaft and adapted to prevent its rotation, and a lever adapted to apply one of said brakes when moved in one direction, said movement being limited by the brake, the said lever being adapted to be moved further in the same direction and to fully apply the other brake upon a failure of the first brake.

10. In a hoisting apparatus, a motor having a drive shaft, a hoisting drum, a driving connection between said drive shaft and drum, a service brake comprising a brake drum fixed to the hoisting drum and a brake band adapted to be contracted about said brake drum, an emergency brake comprising a brake drum fixed to the motor drive shaft and a brake band adapted to be contracted about said brake drum, and brake operating means adapted to be shifted in one direction to apply the service brake the extent of said shift being limited by the service brake band, and an operative connection between said brake operating means and the emergency brake band, said brake operating means being adapted to be shifted further in the same direction to contract the emergency brake band upon a failure of the service brake band, whereby the hoisting drum will be controlled by the emergency brake through the drive shaft and the driving connection.

In testimony whereof I hereunto affix my signature.

SIDNEY M. HUNN.